US005510171A

United States Patent [19]

Faykish

[11] Patent Number: 5,510,171
[45] Date of Patent: Apr. 23, 1996

[54] DURABLE SECURITY LAMINATE WITH HOLOGRAM

[75] Inventor: Lynn E. Faykish, Minneapolis, Minn.

[73] Assignee: Minnesota Mining and Manufacturing Company, St. Paul, Minn.

[21] Appl. No.: 375,531

[22] Filed: Jan. 19, 1995

[51] Int. Cl.$^6$ .................................................. B32B 3/00
[52] U.S. Cl. .......................... 428/195; 428/201; 428/202; 428/204; 428/261; 428/480; 428/483; 428/500; 428/522; 428/694 RL
[58] Field of Search .................................. 428/913, 917, 428/195, 206, 343, 516, 141, 916, 517, 42, 43, 76, 174, 187, 261, 481, 694 RL, 201, 202, 204, 480, 483, 500, 522; 283/81, 94, 108; 359/2

[56] References Cited

U.S. PATENT DOCUMENTS

| Re. 24,906 | 12/1960 | Ulrich | 206/59 |
|---|---|---|---|
| 1,003,443 | 9/1911 | Erickson . | |
| 2,181,252 | 11/1939 | Vogel | 229/80 |
| 3,239,478 | 3/1966 | Harlan, Jr. | 260/27 |
| 3,487,567 | 1/1970 | Waybright | 40/22 |
| 3,631,617 | 1/1972 | Pekke | 40/2.2 |
| 3,801,183 | 4/1974 | Sevelin et al. | 350/105 |
| 3,802,724 | 4/1974 | Gosnell | 283/9 |
| 3,864,855 | 2/1975 | Pekko et al. | 40/2 |
| 3,891,242 | 6/1975 | Arnold et al. | 283/6 |
| 3,923,198 | 12/1975 | Brochman | 220/359 |
| 3,925,584 | 12/1975 | Suzuki et al. | 428/40 |
| 3,933,304 | 1/1976 | Judd | 229/62 |
| 3,935,960 | 2/1976 | Cornell | 220/260 |
| 4,028,165 | 6/1977 | Rosenfeld | 156/234 |
| 4,068,028 | 1/1978 | Samonides | 428/40 |
| 4,082,873 | 4/1978 | Williams | 428/40 |
| 4,121,003 | 10/1978 | Williams | 428/40 |
| 4,180,929 | 1/1980 | Schultz, Jr. | 40/2.2 |

(List continued on next page.)

FOREIGN PATENT DOCUMENTS

| 0000401 | 7/1978 | European Pat. Off. | F24D 9/02 |
|---|---|---|---|
| 0396428 | 11/1990 | European Pat. Off. | B65D 33/34 |
| 0491099 | 6/1992 | European Pat. Off. | G09F 3/02 |
| 2451081 | 10/1980 | France . | |
| 2597405 | 10/1987 | France | B32B 7/12 |
| 2511367 | 10/1975 | Germany . | |
| 2803434 | 8/1979 | Germany . | |
| 2952322C2 | 7/1981 | Germany . | |
| 2173150 | 10/1986 | United Kingdom | B32B 7/06 |
| 2200337 | 8/1988 | United Kingdom | B65D 33/34 |

OTHER PUBLICATIONS

Brochure entitled "Turn Your Label Into A Security System", 3M Identification and Converter Systems Division; Form No. 70–0703–5359–7 (71.5)ii (1991).
Permanent Data page—Scotch™ Label Component Systems; 3M Identification and Coventer Systems Division; Form No. 70–0704–8194–3 (23.3)R1 (Jan. 28, 1993).

(List continued on next page.)

Primary Examiner—Patrick J. Ryan
Assistant Examiner—William A. Krynski
Attorney, Agent, or Firm—Gary L. Griswold; Walter N. Kirn; Peter L. Olson

[57] ABSTRACT

A security laminate comprising a protective layer having first and second surfaces, an embossing layer bonded to at least a portion of the second surface of the protective layer, a reflective layer bonded to at least a portion of the embossed layer/protective layer composite, an adhesion enhancing layer bonded to a portion of the reflective layer/embossed layer/protective layer composite, an adhesive bonded to at least a portion of the adhesion enhancing layer/reflective layer/embossed layer/protective layer composite wherein the bond between the reflective layer and the adhesion enhancing layer and the bond between the adhesion enhancing layer and the adhesive are each more tenacious than the bond between the reflective layer and the embossed layer and further wherein the bond between the adhesive and the adhesion enhancing layer is more tenacious than the bond between the adhesive and the reflective layer.

14 Claims, 2 Drawing Sheets

U.S. PATENT DOCUMENTS

| | | | |
|---|---|---|---|
| 4,184,701 | 1/1980 | Franklin et al. | 283/9 |
| 4,246,307 | 1/1981 | Trautwein | 428/43 |
| 4,475,661 | 10/1984 | Griffin | 215/366 |
| 4,505,399 | 3/1985 | Weiner | 215/230 |
| 4,557,505 | 12/1985 | Schaefer et al. | 283/81 |
| 4,588,465 | 5/1986 | Paciorek | 156/220 |
| 4,608,288 | 8/1986 | Spindler | 428/78 |
| 4,627,642 | 12/1986 | Peronneau et al. | 283/92 |
| 4,630,891 | 12/1986 | Li | 350/105 |
| 4,652,473 | 3/1987 | Han | 428/35 |
| 4,653,113 | 3/1987 | Taylor | 383/5 |
| 4,684,554 | 8/1987 | Ou-Yang | 428/35 |
| 4,709,396 | 11/1987 | Voshall et al. | 383/5 |
| 4,709,397 | 11/1987 | Voshall et al. | 383/5 |
| 4,717,615 | 1/1988 | Reinhart | 428/161 |
| 4,718,553 | 1/1988 | Adamoli et al. | 206/459 |
| 4,721,217 | 1/1988 | Phillips et al. | 215/230 |
| 4,721,638 | 1/1988 | Matsuguchi et al. | 428/40 |
| 4,728,377 | 3/1988 | Gallagher | 156/58 |
| 4,737,559 | 4/1988 | Kellen et al. | 526/291 |
| 4,746,556 | 5/1988 | Matsuguchi et al. | 428/40 |
| 4,747,620 | 5/1988 | Kay et al. | 283/86 |
| 4,760,919 | 8/1988 | Pereyra | 206/484.2 |
| 4,763,931 | 8/1988 | Matsuguchi et al. | 283/108 |
| 4,772,650 | 9/1988 | Ou-Yang | 524/271 |
| 4,773,677 | 9/1988 | Plasse | 283/77 |
| 4,804,096 | 2/1989 | Harding | 215/228 |
| 4,838,708 | 6/1989 | Holcomb et al. | 383/5 |
| 4,856,857 | 8/1989 | Takeuchi et al. | 350/3.6 |
| 4,876,123 | 10/1989 | Rivera et al. | 428/34.2 |
| 4,908,285 | 3/1990 | Kushibiki et al. | 430/1 |
| 4,913,504 | 4/1990 | Gallagher | 350/35.6 |
| 4,915,994 | 4/1990 | Begelfer et al. | 428/40 |
| 4,937,040 | 6/1990 | Holcomb et al. | 383/5 |
| 4,941,196 | 7/1990 | Edelman et al. | 383/5 |
| 4,972,953 | 11/1990 | Friedman et al. | 206/459 |
| 4,980,222 | 12/1990 | Rivera et al. | 428/195 |
| 4,988,547 | 1/1991 | Voto, Jr. et al. | 428/35.2 |
| 4,998,666 | 3/1991 | Ewan | 229/102 |
| 5,008,139 | 4/1991 | Ochi et al. | 428/40 |
| 5,080,463 | 1/1992 | Faykish et al. | 359/536 |
| 5,082,702 | 1/1992 | Alband | 428/36.92 |
| 5,104,719 | 4/1992 | Kamen et al. | 428/195 |
| 5,153,042 | 10/1992 | Indrelie | 428/4 |
| 5,169,707 | 12/1992 | Faykish et al. | 428/195 |
| 5,277,971 | 1/1994 | Weng et al. | 428/343 |
| 5,294,470 | 3/1994 | Ewan | 428/40 |
| 5,319,475 | 6/1994 | Kay et al. | 359/2 |
| 5,346,259 | 9/1994 | Mocilnikar et al. | 283/108 |
| 5,358,281 | 10/1994 | Greig | 283/81 |
| 5,405,692 | 4/1995 | Weng et al. | 428/343 |

OTHER PUBLICATIONS

Technical Report—The Label Component System Process Guide; 3M Identification and Converter Systems Division; Form No. 70-0703-5364-7(81.5)R1 (undated).

Brochure entitled "Scotch™ Protected Graphics Systems"; Converter Specialties Division/3M; Form No. 70-0701-7040-5(126.5)R1 CRD 168A (undated).

Brochure entitled "Tamper Resistant packaging from 3M", 3M Tamper Resistant Packaging Center/3M; (undated).

Brochure entitled "SecurMark™ Labeling Systems—Built in Destruct Pattern Clearly Indicates Tampering"; 3M Converter Specialties Division; Form No. 70-0702-2444-0 (undated).

Brochure entitled "SecurMark™ Computer Imprintable Labeling System"; 3M Converter Specialties Division; Form No. 70-0702-7605-3 (79.5)ii (undated).

Brochure entitled "Label Component Systems—Create Your Own Customized Tamper-Indicating Labels with Scotch™ Brand Label Components"; 3M Converter Specialties Division; Form No. 70-0702-7690-5 (30.5)ii (undated).

Do "Marketeers" Miss the Tremendous Capabilities of Embossed Holograms? paper & Kunststoff Verarbeiter (dated 1986).

White light holograms for credit cards by K. J. Schell, SPIE vol. 523 pp. 331-335 (dated 1985).

Using Embossed Holography to Enhance Package Appeal by Russell R. Lacoste, Polymers, Laminations and Coatings Conference pp. 285-287 (dated 1987).

Rainbows at Work—Holographic Substrates by Kirk Meade, Screen Printing vol. 75 No. 1 Jan. 1985 pp. 50, 52, 53A.

Holographic Advances Open New Dimensions For Converters by S. F. Mann, Paper, Film & Coil Converter pp. 36-38, Jul. 1986.

Labels & Labelling: Hologam labelling, Packaging Week p. 241, Sep. 10, 1986.

Holographic Films by Anon, Food Drug Packag. vol. 50. No. 3, Mar. 1986 p. 58.

DURABLE SECURITY LAMINATE WITH HOLOGRAM

FIELD OF THE INVENTION

This invention relates to security laminates such as are used to protect documents from tampering or alteration.

BACKGROUND OF THE INVENTION

Security laminates are traditionally used to protect documents or packages to ensure that the underlying items are not altered. Security laminates are particularly useful on identification cards such as driver's licenses and passports, and on other important documents such as certificates of title. Security laminates are also useful as tamper proof seals on medications, video cassettes, and compact discs. Five features are particularly important when producing and using security laminates. First, once applied to an article it is important that the laminate is difficult to remove to ensure that the underlying item is not altered or subjected to tampering. Second, a desirable laminate is difficult if not impossible to duplicate by counterfeiters. Third, if tampering occurs it is important to quickly and accurately recognize an altered or counterfeit laminate. Fourth, it is important that manufacturing costs of the laminates are not prohibitively expensive. Fifth, when used on articles such as identification cards, it is important that the laminate has sufficient durability to withstand harsh treatment.

Security laminates are constructed of various materials. In order to overcome the problem of counterfeit documents, manufacturers have made it exceedingly difficult for counterfeiters to duplicate the security laminate used on a particular document. Some constructions require special viewing devices to discern whether or not the laminate was subjected to tampering. Such laminates are disclosed in U.S. Pat. Nos. 4,630,891, 5,080,463, and 5,169,707. These laminates consist of a multilayer film with one of the layers comprised of a binder embedded with microspheres to impart a retroreflective appearance to the laminate. The microsphere-containing layer is typically printed with a customer-specified logo. The retroreflective laminate is adhesively bound to the document. These constructions are difficult to imitate by counterfeiters because it is difficult to imitate the customer-specific retroreflective printing. However, in order to determine authenticity of the laminates, special retroreflective viewing equipment is required to view the customer-specific printing. Tampering is indicated by damage to the continuity of the retroreflective layer, visible as dark lines or discoloration which does not retroreflect. Therefore, it is difficult to detect authenticity of the document with the naked eye. This type of laminate is also expensive to manufacture clue to multiple layers and a sophisticated process control which is necessary to manufacture the laminate.

Multilayer film constructions containing intermediate layers having optical properties such as holograms or kinegrams are often used in security laminates. If the security laminate in these constructions is disturbed due to tampering, the holograms are destroyed. Tampering is therefore readily apparent when viewing the document with the naked eye. However, the film layer containing the holographic optical pattern is not transparent and is also quite expensive. These laminate constructions do not overcome all of the problems associated with security laminates because it is undesirable to cover an entire document or package with an opaque, expensive multilayer film. Further, it is necessary to properly register the opaque hologram on the document so as not to obscure any underlying data.

One relatively inexpensive laminate construction is described in German Patent Application No. DE-C-25 11 367. This reference discloses laminating a document between two films and further including a pattern of adhesion-reducing coating either on the film or on the document before laminating. Once the layers are laminated, little or no bond exists in those places coated with the adhesion-reducing coating. Attempts to tamper with a document laminated with such a construction ordinarily results in destruction of the article to which the laminate is adhered. However, skilled tamperers are capable of removing the film without damaging the underlying article by using heat.

U.S. Pat. Nos. 4,876,123 and 5,082,702 disclose tamperproof multilayer films which are not transparent. During attempts to tamper, the multilayer constructions are destroyed and both sides of the separated film layers display an originally concealed colored print. Tampering with these constructions is apparent to the unaided eye and the films are also impossible to relaminate without visible damage. However, laminates having these constructions are not useful on identification documents because they are not transparent.

U.S. Pat. No. 5,153,042 discloses a tamper-indicating labelstock or security laminate comprised of a transparent facestock, a release coating attached to one surface of the facestock for providing an indicia, a polymer coated on the facestock and release coating, a frangible metal layer, and an adhesive layer. The labelstock is easily broken when tampering occurs which reveals the indicia printed by the release coating. Construction of this laminate requires flood coating primer over the release coating. Since the laminate is intended for use as a labelstock, it is easily delaminated. Such a construction is not ideal for security laminates used to protect documents because the laminate is not durable enough and would split prematurely under everyday abuse. Also, this type of construction is easily delaminated with heat, rendering tampering possible.

A transparent self-adhesive film which includes printing is described in German Patent Application No. DE-A-28 03 434. When the film is lifted during tampering, the printing remains on the document. If a photograph is exchanged for the original, the tamperer must only reproduce the printing on the new photograph which is a relatively easy task for a skilled tamperer. Constructions such as those described do not overcome the problem of imitation by counterfeiters.

Security laminates have also included an intermediate layer of ink-containing microcapsules as described in French Publication No. FR-A-2-451-081. The capsules break during tampering which results in discoloration of the document. Although tampering is readily apparent to the unaided eye, the microcapsules create at least two disadvantages which are unacceptable in the field of transparent security laminates. The microcapsules reduce the transparency of the film and the microcapsules frequently tend to break during normal use of the document. Thus, such a laminate is too fragile for use on identification cards subjected to daily abuses which would cause the microcapsules to fracture.

Another method of manufacturing tamper-proof documents is described in German Patent No. DE-C-29 52 322. A document is coated with a polyethylene film coated with an adhesive which requires cross-linking by ultraviolet irradiation. The resultant laminate provides a high degree of security, however, it is again prohibitively expensive to place irradiation equipment and the corresponding protection equipment at every document distribution location.

None of the references described above solve the above-mentioned problems with security laminates. That is, a security laminate which is transparent, inexpensive to manufacture, difficult to imitate by counterfeiters, readily evidences tampering, and is sufficiently durable to use on identification cards.

SUMMARY OF THE INVENTION

A security laminate comprising a (1) protective layer having a first and a second surface, (2) an embossed layer comprising either embossing directly into the second surface of the protective layer or comprising a separate embossed layer or bonded to at least a portion of the second surface of the protective layer, (3) a reflective layer bonded to at least a portion of the embossed layer/protective layer composite, (4) an adhesion enhancing layer bonded to a portion of the reflective layer/embossed layer/protective layer composite, and (5) an adhesive bonded to at least a portion of the adhesion enhancing layer/reflective layer/embossed layer/ protective layer composite wherein the bond between the reflective layer and the adhesion enhancing layer and the bond between the adhesion enhancing layer and the adhesive are each more tenacious than the bond between the reflective layer and the embossed layer, further wherein the bond between the adhesive and the adhesion enhancing layer is more tenacious than the bond between the adhesive and the reflective layer.

BRIEF DESCRIPTION OF THE DRAWINGS

The invention is further explained with reference to the drawings wherein.

These figures, which are idealized and are not to scale, are intended as merely illustrative and nonlimiting.

DETAILED DESCRIPTION OF THE INVENTION

Figure 1:
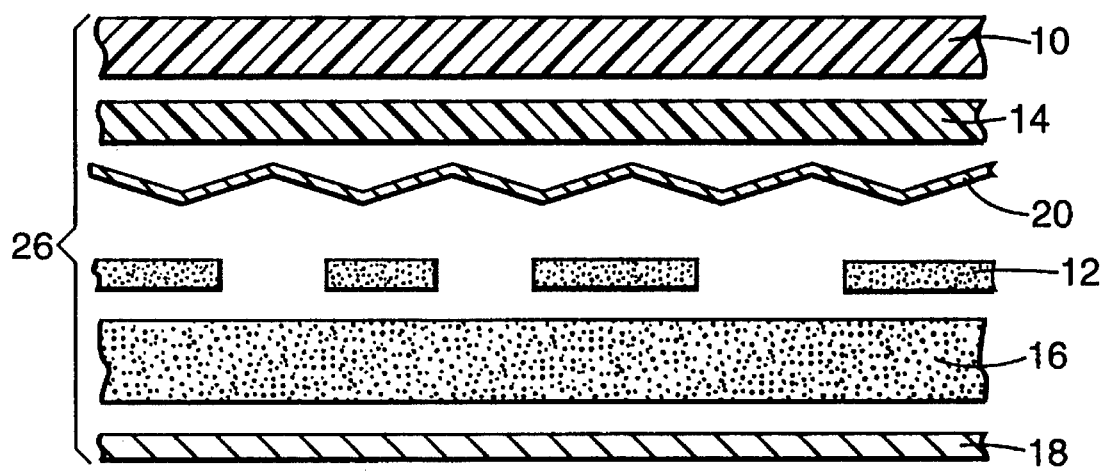
FIG. 1 is an exploded side view of the security laminate of the present invention adhered to a document.

The laminate of the present invention is shown generally in FIG. 1 as 26. The laminate of the invention is comprised of the following layers designated as the protective layer 10, embossed layer 14, reflective layer 20, adhesion enhancing layer 12, and the adhesive layer 16. Each of the layers is first described in detail followed by a discussion of the interaction of the layers by the corresponding tenacities of the bonds between the layers. For purposes of this disclosure, the term "delaminate" refers to removing or attempting to remove a laminate from the document or article to which the laminate is adhered.

Protective Layer

A protective layer 10 is provided. The protective layer 10 provides protection for the security laminate and document, protecting the article against cuts, scratches or other similar abuse. In addition, the protective layer 10 ultimately covers the underlying article or document 18 such that one must lift the protective layer 10, along with the rest of the laminate, in order to tamper with the article 18. The protective layer 10 is preferably transparent, allowing use of the security laminate 26 on identification documents such as driver's licenses and passports. Additionally, the protective layer 10 is preferably substantially impervious to scratches. This characteristic permits use of the laminate 26 on articles which are subjected to daily abuse. Illustrative examples of suitable materials for the protective layer of the invention include polyethylene terephthalate (polyester), polyvinyl chloride, polyolefin, or cellulose acetate films. Preferably, polyester is used if the invention is intended for use on identification documents, whereas polyvinyl chloride is the preferred protective layer material if the laminate is intended for use on lower value documents or items in order to limit material costs.

Embossed Layer

In one embodiment of the invention, the protective layer 10 is coated with a deformable material 14 which readily deforms when subjected to heat and pressure. An example of a material suitable for embossing is a resin which readily adheres to the protective layer 10. If the protective layer 10 is polyester, some preferred materials for the embossing resin are polystyrene, polymethyl methacrylate, or nitrocellulose-based resins. In one embodiment the embossing layer 14 is preferably embossed with a micro-structured relief pattern of holographic or diffraction grating images in the form of logos or patterns which reflect light. Although embossing is preferably done by contacting a non-deformable embossing plate to the embossing layer 14 using heat and pressure, an alternate embodiment includes curing polyacrylate or polyurethane-based embossing resins using ultraviolet light during embossing. In yet an alternate embodiment, logos are embossed directly into the second side of the protective layer 10 using heat and pressure.

Reflective Layer

The reflective layer 20 is coated on the embossed layer 14 either before or after embossing. Reflective layer 20 preferably has a higher refractive index than the embossed layer 14. In a preferred embodiment, the reflective layer 20 is substantially transparent and colorless. Illustrative examples of suitable reflective layer materials include but are not limited to bismuth trioxide, zinc sulfide, titanium dioxide and zirconium oxide which are described in U.S. Pat. No. 4,856,857. The reflective layer 20 enhances the reflection of light through the embossed 14 and protective layers 10 due to the difference in refractive index between the embossed 14 and reflective layers 20. Thus, the embossing is more readily visible to the naked eye once the reflective layer 20 is coated on the embossing, and an adhesive can be applied without diminishing the visibility of the embossed pattern. Suitable holographic films with embossed and reflective layers are available from Crown Roll Leaf of Paterson, N.J., Transfer Print Foils of East Brunswick, N.J., or Optical Security Industries of London, England.

Adhesion Enhancing Layer

An adhesion enhancing layer 12 which is preferably transparent is next applied to the reflective layer 20. The adhesion enhancing layer 12 is preferably printed on the reflective layer 20 in a repetitive or easily recognizable pattern such that the adhesion enhancing layer 12 only partially covers the reflective layer 20. Examples of some preferred patterns for printing the adhesion enhancing layer 12 include, but are not limited to, checkerboards, dots, legible messages such as "VOID" and logos.

Figure 3:
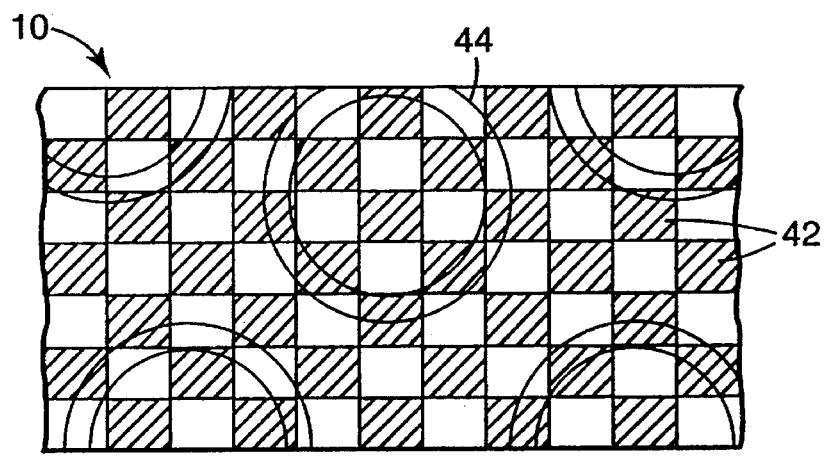
FIG. 3 is a top view of the laminate of FIG. 2

During delamination, the adhesion enhancing layer 12 prohibits removal of the reflective layer 20 from the document 18 in those areas printed with the adhesion enhancing layer 12. The adhesion enhancing layer 12 in part allows for controlled failure of the laminate composite 26. FIG. 3 depicts a laminate which was removed from an article having an adhesion enhancing layer 12 printed in a checkerboard fashion.

Illustrative examples of suitable materials for the adhesion enhancing layer are water-based vinyl acetate or preferably ethylene acrylic acid resins. The purpose of the adhesion enhancing layer 12 is more fully described below when interaction of the layers and corresponding bonds between the adjacent layers of the present invention are discussed.

Adhesive Layer

An adhesive 16 is bonded to the adhesion enhancing layer 12/reflective layer 20/embossed layer 14/protective layer 10 composite. Among other things, the adhesive allows adherence of the laminate composite to an article or document 18. Heat-activated adhesives or pressure sensitive adhesives can be used in the present invention. Illustrative examples of suitable heat-activated adhesives are polyethylene based copolymers such as ethylene acrylic acid, ethylene ethyl acrylate, and preferably, ethylene vinyl acetate. Due to the construction of the present laminate, the reflective layer splits in the pattern of the adhesion enhancing layer, pulling apart the reflective layer and evidencing tampering when delaminated.

A laminate of the present invention which uses pressure sensitive adhesive will evidence tampering if the document is delaminated under heated conditions. Pressure sensitive adhesives do soften when heated; however, due to the construction of the present invention, the adhesive splits and pulls apart in the pattern of the adhesion enhancing coating even when heated, evidencing tampering. Illustrative examples of suitable pressure sensitive adhesives are PSA 966 Scotch Brand High Temperature Acrylic adhesive and Isotac™ acrylic adhesive, both available from Minnesota Mining and Manufacturing Company of St. Paul, Minn.

Bond Tenacities

The relative bond tenacities between the adjacent layers of the laminate are important to the present invention. A controlled failure is preferred when an attempt is made to delaminate documents laminated with the present invention. Separation of the layers due to delamination is first discussed followed by a discussion of the relative bond tenacities between the layers required to obtain such a controlled failure of the laminate.

Figure 2:
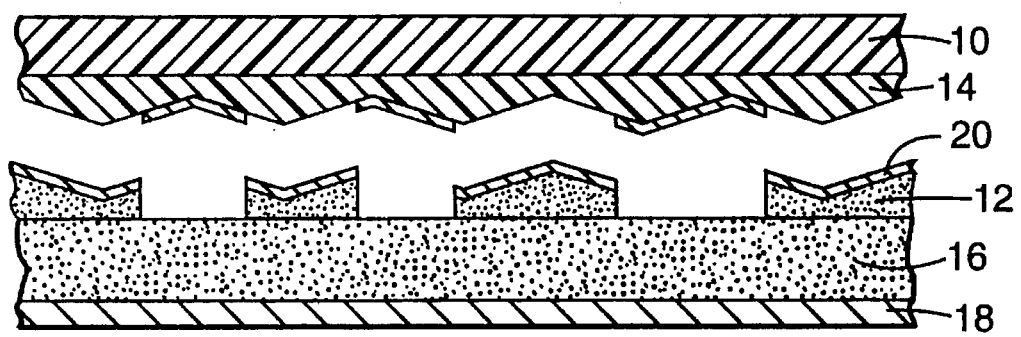
FIG. 2 is a side view of the security laminate of the present invention after an attempt to delaminate the document to which the security laminate was adhered under ambient conditions.

Upon an attempt to remove the laminate 26 from a document 18, the laminate of the invention splits substantially in a manner depicted in FIG. 2 when the adhesive 16 is a heat-activated adhesive. The protective layer 10 lifts, bringing with it the embossed layer 14 and the reflective layer 20 in the areas where the adhesion enhancing layer 12 is absent. The adhesion enhancing layer 12 only partially covers the reflective layer 20 which causes the reflective layer 20 to split. Due to the different tenacities of the bonds between the reflective layer 20 and its adjacent layers, the reflective layer 20 splits substantially in the pattern of the printing of the adhesion enhancing layer 12.

Figure 4:
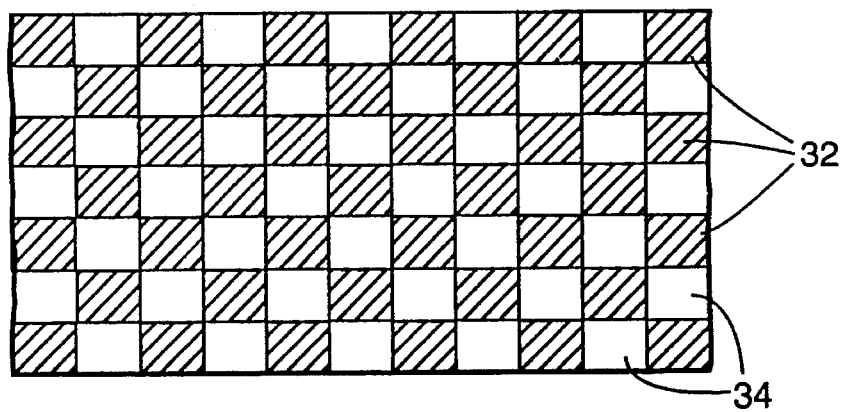
FIG. 4 is a top view of the document from which the laminate of FIG. 3 was removed.

FIG. 3 depicts a top view of a laminate of the invention removed from a document to which it was previously adhered. FIG. 4 depicts a top view of the document from which the laminate of FIG. 3 was removed. Upon an attempt to delaminate a document, the reflective layer 20 of the security laminate splits. The shaded areas 32 and 42 in FIGS. 3 and 4 depict areas where the reflective layer is adhered. The shaded areas in FIG. 3 are complementary to the shaded areas in FIG. 4. The areas represented as 32 (shaded) on FIG. 4 show where the adhesion enhancing layer was printed and the reflective layer therefore adhered upon delamination. Areas depicted as 34 (unshaded) on the document in FIG. 4 show where the adhesion enhancing coating was absent and the reflective layer did not adhere. In FIG. 3 areas depicted as 42 (shaded) show where the adhesive enhancing coating was absent and the reflective layer 42 therefore adhered to the embossed layer 14 shown in FIG. 3 in a checkerboard pattern complementary to the areas which the reflective layer is adhered to the document in FIG. 4.

The embossed layer is visible in the shape of emblems 44 in FIG. 3. The embossed layer 14 (as shown in FIG. 2) remains substantially adhered to the protective coating 10 after delamination, leaving the emblems 44 (as shown in FIG. 3) substantially intact. Referring now to FIG. 2, the reflective layer 20 splits and adheres to the embossed layer14/protective layer 10 composite in a checkerboard pattern. The reflective layer 20 also adheres to the adhesive 16 and the document 18 in a checkerboard pattern. This controlled failure renders it very difficult to reach the underlying document 18 in order to alter the document without evidencing the tampering. It is not possible to adhere the laminate back together on the document without detection because it is impossible to match the split reflector layer 20 in order to reconstruct the continuous reflection of the embossed layer 14. The peeled laminate is not reusable on a different document because the areas of missing reflector create a discontinuous reflection of the embossed layer 14 when relaminated. In order to obtain such a controlled failure: upon delaminating, the bond between the reflective layer 20 and the adhesion enhancing layer 12 and the bond between the adhesion enhancing layer 12 and the adhesive 16 are each more tenacious then the bond between the reflective layer 20 and the embossed layer 14.

Figure 5:
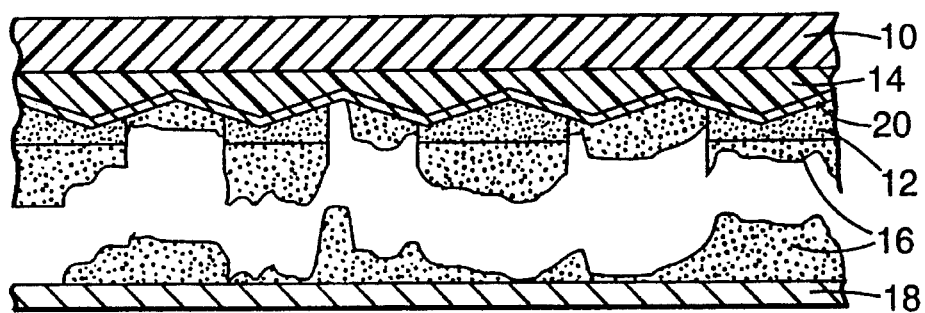
FIG. 5 is a side view of the security laminate of the present invention after an attempt to delaminate the document using heat.

When the adhesive 16 is a pressure sensitive adhesive, the laminate of the invention splits substantially in a manner depicted in FIG. 5 when heat is used in an attempt to delaminate the document 18. The protective layer 10 lifts, bringing with it the embossed layer 14, the reflective layer 20, the adhesion enhancing layer 12, and the adhesive 16 in the areas where the adhesion enhancing layer 12 is present. Due to different tenacities of the bonds between the adhesive 16 and its adjacent layers, the adhesive 16 splits substantially in the pattern of the adhesion enhancing layer 12 when heat is used for delamination. In order to obtain such controlled failures upon delaminating, the bond between the adhesive 16 and the adhesion enhancing layer 12 is more tenacious than the bond between the adhesive 16 and the reflective layer 20. However, all of the bonds between all layers are preferably still be strong enough to provide a durable laminate for ID cards.

Durability testing includes (1) exposing a security laminated document to a laundry and to a drying cycle, (2) flexing the document, and (3) shaking the document in a paint shaker with sand and water. Laminates with the constructions described above can withstand such durability testing, described more fully below. By withstanding durability testing it is meant that if the security laminate of the invention is adhered to a standard identification card, the laminate will show substantially no premature release between any layers.

The selection of the protective layer 10, the embossed layer 14, the adhesion enhancing coating 12, the reflective layer 20 and the adhesive 16 is made as a combination to provide suitable bond tenacities between the adjacent layers. Illustrative examples of combinations providing suitable bond tenacity differentials are presented in the Examples below. It is contemplated that many other combinations will also satisfy the requirements for constructing a security laminate according to the present invention.

EXAMPLES

The invention is further explained by the following illustrative examples which are intended as non-limiting.

Each Example includes a discussion of how the particular laminate was manufactured, how the laminate was applied to a document, and finally, how the laminate appeared after delamination.

Example 1

Laminate Preparation

A transparent hologram film type XPT, as purchased from Crown Roll Leaf of Paterson, N.J., was used in the present Example. It is believed that the Crown Roll Leaf hologram was prepared by embossing a holographic image into polystyrene-based embossing resin with a high index reflector, such as zinc sulfide, which were coated on a polyester film. The reflector side of the purchased hologram film was flexographically printed with a checkerboard pattern of adhesion enhancing coating. Adcote 50T4983 water-based ethylene acrylic acid as manufactured by Morton International, Inc. of Chicago, Ill. was used as the adhesion enhancing coating. The adhesion enhancing printed side was treated using corona discharge. A film of ethylene vinyl acetate heat activated adhesive was corona treated, then hot laminated at 270° F. (132° C.) to the adhesion enhancing printed side to form a laminate using Desk Top Heat Laminator Model No. 5000 as manufactured by Thermal Laminating Corporation of Chicago, Ill. The holographic laminate was then applied to photographic-based identification cards using the same laminator. The photographic-based identification cards were dry gelatin-based photos with a picture and personal data photographically imaged onto the document.

Tampering

Ambient Temperature

The laminate was peeled from a card at room temperature in an attempt to reach and alter the underlying identification card. The protective layer of the laminate was lifted along with the embossed layer and the reflective layer in the areas which were not adhered to the adhesion enhancing patterned layer. Because the adhesion enhancing layer was originally printed on the reflective layer in a checkerboard pattern, the reflective layer was caused to split in a checkerboard fashion complementary to the pattern of the adhesion enhancing layer due to the differential bond tenacity between each of the layers.

Water

A laminated card was soaked in water for 24 hours. Upon an attempt to remove the laminate from the document, the reflective layer split in the pattern of adhesion enhancing coating. Due to the damage rendered to the reflector, it was impossible to relaminate the same card or to use the laminate on a different card without evidence of tampering.

Durability Testing

Additional laminated cards were subjected to the following tests to evaluate the durability of the construction:

A. Washing Machine

A laminated card was placed in a washing machine filled with clothes and placed on the permanent press cycle followed by drying for 30 minutes on the permanent press cycle. The laminate and card were not damaged.

B. Flexing

A laminated card was flexed back and forth at 90 degree angles for 1000 cycles using a Getty Fatigue Flex Tester model #0 manufactured by Getty Machine and Mold Company of Clifton, N.J. The laminate and card were not damaged.

C. Severe Durability Test

A laminated card was placed in a 1 gallon paint can with 20 milliliters of water and 10 grams of sand and shaken in a paint shaker for 15 minutes. Minimal delamination of the adhesive from the card occurred only at the corners of the card. Durability was acceptable when compared to standard identification card laminates such as 3M Scotchpak Brand polyester laminate with hot melt adhesive.

Example 2

The protocol of Example 1 for the laminate preparation was followed except that a pressure-sensitive adhesive was used to adhere the laminate to the document in place of the corona treatment and heat activated adhesive. PSA 966 Scotch Brand High Temperature Acrylic adhesive coated on a silicone release liner available from 3M Company of St. Paul, Minn. was laminated to the polyester/embossing layer/ reflective layer/adhesion enhancing layer composite using a hand squeegee. The laminate was applied to a photo adhered to a paper document also using a hand squeegee.

Tampering

Ambient Temperature

When an attempt was made to peel the laminate from the document at room temperature, the paper document and photo were torn and it was impossible to remove the laminate from the document.

Heated Delamination

Another laminated document was heated to between about 210° F. (99° C.) and about 250° F. (121° C.) on a hot plate and the laminate was peeled from the document at the elevated temperature to determine whether it was possible to heat delaminate the document. The adhesive layer split in the pattern of the adhesion enhancing coating, causing some adhesive to adhere to the document where the adhesion enhancing pattern was not present and some adhesive to adhere to the laminate where the adhesion enhancing pattern was present. Due to the textured damage of the adhesive, it was impossible to relaminate the same document or to use the laminate on a different document without evidence of tampering.

Example 3

A transparent hologram film was purchased from Transfer Print Foils of East Brunswick, N.J. It is believed that the hologram was prepared by embossing a holographic image into nitrocellulose-based embossing resin with a high index reflector, such as zinc sulfide, which were coated on a polyester film. The protocol of Example 1 was then followed to print the adhesion enhancing pattern and to laminate the heat activated adhesive. Two pieces of the laminate were heat laminated together with the adhesive sides facing each other. The pieces were pulled apart by hand. The adhesive and reflector layers split in the adhesion enhancing pattern which caused damage to both pieces of laminate.

Various modifications and alterations of this invention will become apparent to those skilled in the art without departing from the scope and spirit of this invention.

What is claimed is:

1. A security laminate, comprising:

(a) protective layer having first and second surfaces;

(b) embossed layer having first and second surfaces, the first surface of the embossed layer bonded to at least a portion of the second surface of the protective layer;

(c) reflective layer having first and second surfaces, the first surface of the reflective layer bonded to at least a portion of the second surface of the embossed layer; and (d) adhesion enhancing layer bonded to only a portion of the second surface of the reflective layer; and (e) adhesive bonded to at least a portion of the adhesion enhancing layer/reflective layer/embossed layer/protective layer composite wherein the bond between the reflective layer and the adhesion enhancing layer and the bond between the adhesion enhancing layer and the adhesive are each more tenacious than the bond between the reflective layer and the embossed layer and further wherein the bond between the adhesive and the adhesion enhancing layer is more tenacious than the bond between the adhesive and the reflective layer.

2. The security laminate of claim 1 wherein said adhesion enhancing layer comprises of ethylene acrylic acid.

3. The security laminate of claim 1 wherein said adhesion enhancing layer is invisible to the unaided eye.

4. The security laminate of claim 1 wherein said embossed layer has an image visible to the unaided eye.

5. The security laminate of claim 1 wherein said embossed layer is selected from the group of a polystyrene, polymethyl methacrylate, and nitrocellulose based resin.

6. The security laminate of claim 1 wherein said protective layer is transparent.

7. The security laminate of claim 1 wherein said protective layer is selected from the group of polyester, polyvinyl chloride, polyolefin, and cellulose acetate films.

8. The security laminate of claim 1 wherein said adhesive layer comprises heat activated adhesive.

9. The security laminate of claim 1 wherein said adhesive layer comprises pressure sensitive adhesive.

10. The security laminate of claim 9 further comprising a release liner bonded to said adhesive layer.

11. The security laminate of claim 1 wherein said reflective layer has a higher refractive index than said embossed layer.

12. The security laminate of claim 1 wherein said reflective layer is selected from the group of bismuth trioxide, zinc sulfide, titanium dioxide and zirconium oxide.

13. The security laminate of claim 1, wherein said reflective layer is at least partially transparent.

14. An article with a security laminate adhered thereto, said security laminate comprising:

(a) protective layer having first and second surfaces;

(b) embossed layer bonded to at least a portion of the second surface of the protective layer;

(c) reflective layer bonded to at least a portion of the embossed layer/protective layer composite;

(d) adhesion enhancing layer bonded to a portion of the reflective layer/embossed layer/protective layer composite; and (e) adhesive bonded to at least a portion of the adhesion enhancing layer/reflective layer/embossed layer/protective layer composite wherein the bond between the reflective layer and the adhesion enhancing layer and the bond between the adhesion enhancing layer and the adhesive are each more tenacious than the bond between the reflective layer and embossed layer and further wherein the bond between the adhesive and the adhesion enhancing layer is more tenacious than the bond between the adhesive and the reflective layer.

* * * * *

UNITED STATES PATENT AND TRADEMARK OFFICE
CERTIFICATE OF CORRECTION

PATENT NO. : 5,510,171
DATED : April 23, 1996
INVENTOR(S) : Lynn E. Faykish

It is certified that error appears in the above-indentified patent and that said Letters Patent is hereby corrected as shown below:

Col. 1, line 53, "clue" should read --due--.

Col. 6, line 44, "then" should read --than--.

Col. 6, line 62, "be" should be deleted.

Signed and Sealed this

Twenty-fourth Day of June, 1997

*Attest:*

BRUCE LEHMAN

*Attesting Officer*    *Commissioner of Patents and Trademarks*